(12) United States Patent
King et al.

(10) Patent No.: US 12,303,980 B1
(45) Date of Patent: May 20, 2025

(54) PROCESSING OF PCD ELEMENTS (71) Applicant: Smith International, Inc., Houston, TX (US)

(72) Inventors: Mary King, Kingwood, TX (US); Baptiste Germond, Valbonne (FR); Will Kurtz, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 361 days.

(21) Appl. No.: 17/122,633

(22) Filed: Dec. 15, 2020

Related U.S. Application Data

(60) Provisional application No. 62/948,390, filed on Dec. 16, 2019.

(51) Int. Cl.
*C22B 7/00* (2006.01)
*B22F 3/24* (2006.01)
*C01B 32/28* (2017.01)

(52) U.S. Cl.
CPC ............... *B22F 3/24* (2013.01); *C01B 32/28* (2017.08); *C22B 7/006* (2013.01); *B22F 2003/244* (2013.01)

(58) Field of Classification Search
CPC ...... B22F 3/24; B22F 2003/244; C01B 32/28; C22B 7/006; B01J 3/00
See application file for complete search history.

(56) References Cited

U.S. PATENT DOCUMENTS

| | | | | | |
|---|---|---|---|---|---|
| 8,567,531 | B2 * | 10/2013 | Belnap | .................. | E21B 10/567 |
| | | | | | 175/425 |
| 9,682,460 | B2 * | 6/2017 | Ramasamy | ............ | B24D 3/005 |
| 9,963,348 | B2 * | 5/2018 | Weaver | .................. | B05B 14/00 |
| 2016/0289079 | A1 * | 10/2016 | Weaver | ............... | B05B 13/0292 |

FOREIGN PATENT DOCUMENTS

| | | | | | |
|---|---|---|---|---|---|
| CN | 108265297 A | * | 7/2018 | ................ | C23F 1/28 |
| CN | 109701947 A | * | 5/2019 | | |

* cited by examiner

*Primary Examiner* — Pegah Parvini
(74) *Attorney, Agent, or Firm* — Bryan K. Adams; Jeffrey D. Frantz (57) ABSTRACT

A method for processing a PCD element includes placing the PCD element in a vessel. A first fluid may be applied to the PCD element when the PCD element is in the vessel. A second fluid may be applied to the PCD element when the PCD element is in the vessel. A first temperature may be applied to the PCD element when the PCD element is in the vessel. A second temperature may be applied to the PCD element when the PCD element is in the vessel.

18 Claims, 10 Drawing Sheets

PROCESSING OF PCD ELEMENTS

CROSS-REFERENCE TO RELATED APPLICATIONS

This application claims the benefit of, and priority to, U.S. Patent Application No. 62/948,390 filed on Dec. 16, 2019, which is incorporated herein by this reference in its entirety.

BACKGROUND OF THE DISCLOSURE

Polycrystalline diamond (PCD) may be formed of several different grains of diamond that are sintered or fused together in the presence of one or more binders, including catalyst metals or metallic alloys. PCD may be formed into a structure, such as a cutting insert, sometimes referred to as a polycrystalline diamond compact (PDC). In some situations, the binder may have a different rate of thermal expansion than the diamond grains of the PCD. The PCD may be exposed to changes in temperature, such as during manufacturing, post-manufacturing processing, brazing, operation, other sources of temperature change, and combinations thereof. In some situations, the changes in thermal expansion rates between the binder and the diamond grains may stress the PCD. This may lead to brittleness, cracking, breaking, and other failure mechanisms.

To reduce the thermal stress experienced by the PCD, the PCD may be processed to remove some or all of the binder. This process may include leaching, or chemical and/or electrochemical dissolution of the binder. Full or partial leaching of the binder may improve the thermal stability of the PCD, which may improve the performance of the PCD during operation. Conventionally, leaching has been labor intensive, requiring a technician to physically place PCD and/or PDCs in and remove them from the chemical containers. This may be time consuming and may expose the technician to potentially hazardous chemicals. Furthermore, error from the technician may cause irregularity in the leaching process and the final, leached PCD, which may result in waste and/or lost profits.

SUMMARY

In some embodiments, a method for processing polycrystalline diamond (PCD) includes placing a PCD element in a vessel. A first fluid and a second fluid are applied to the PCD element in the vessel. In some embodiments, a first temperature and a second temperature are applied to the PCD element in the vessel.

In other embodiments, a system for processing polycrystalline diamond (PCD) includes a processor and memory, the memory including stored instructions which, when accessed by the processor, cause the processor to apply a first fluid to the PCD in a vessel, apply a second fluid to the PCD in the vessel, apply a first temperature to the PCD in the vessel, and apply a second temperature to the PCD in the vessel.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 4-1 is a representation of a method for processing polycrystalline diamond, according to at least one embodiment of the present disclosure;

FIG. 4-2 is another representation of the method for processing polycrystalline diamond of FIG. 3-1;

DETAILED DESCRIPTION

This disclosure generally relates to devices, systems, and methods for processing polycrystalline diamond (PCD). In some embodiments, PCD leaching may include inserting PCD into a vessel. The leaching process may be automated. Automating the leaching process may reduce the exposure of the technician to the fluid, byproducts of the leaching process, and any other hazardous condition that is a result of leaching. This may improve the health and safety of the technician, reduce costs, enable some equipment (scrubbers, ventilation hoods) to be eliminated or reduced in size, and increase processing speed. In some embodiments, leaching parameters for the environment within a vessel may be changed during the leaching process and/or between batches of the leaching process. For example, the fluids (e.g., leaching chemicals, catalysts, rinsing agents, salts) directed to the vessel to interact with the PCD may be changed. In some embodiments, the temperature of the fluid (e.g., leachant) and/or the PCD may be changed. In some embodiments, the fluid and/or the PCD may be agitated. Changing parameters of the vessel environment may increase the rate of leaching, change the final product, improve the quality (e.g., leach depth, leach area, leach efficacy) of the product, provide any other benefit, and combinations thereof.

Figure 1:
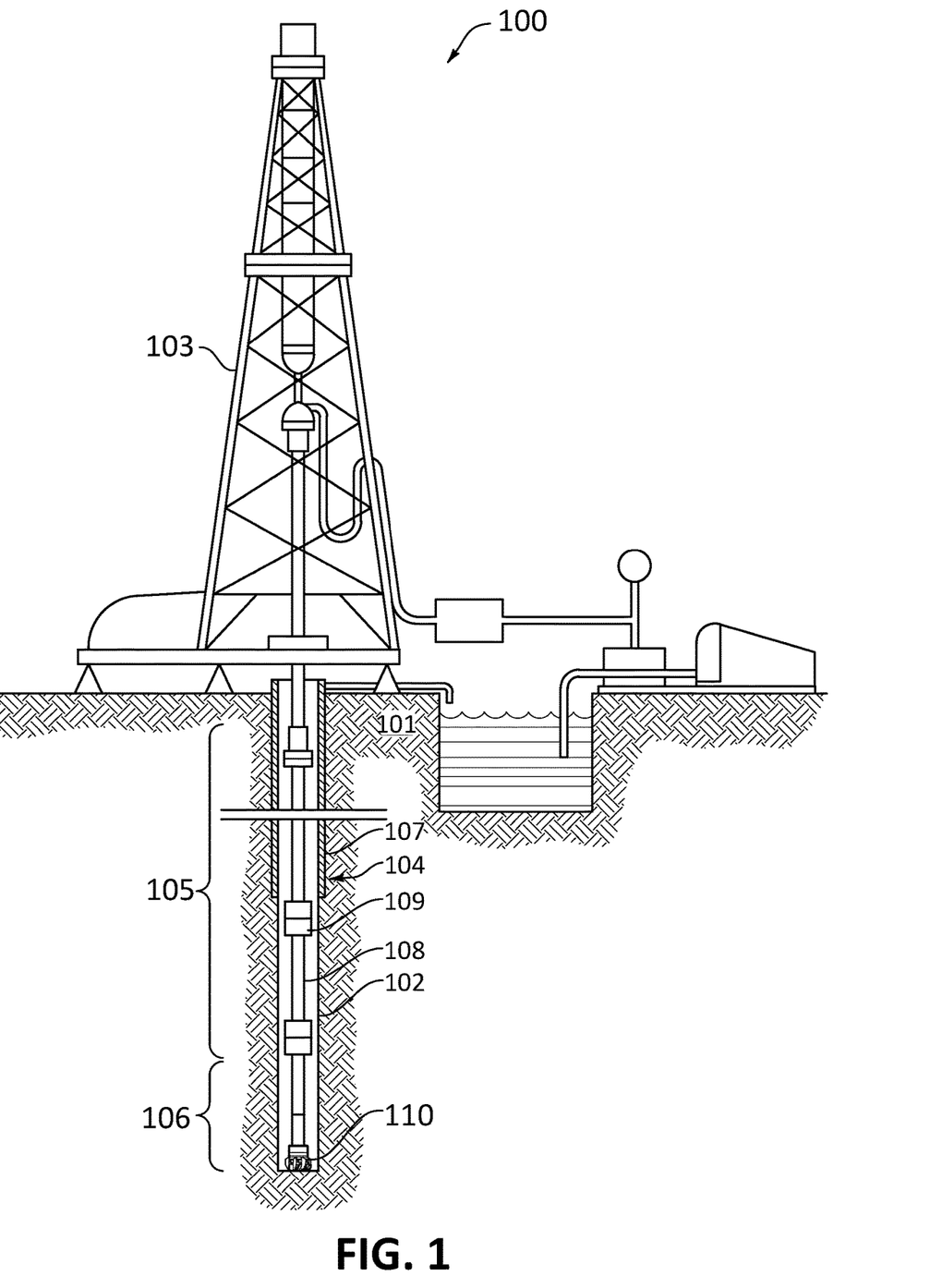
FIG. 1 is a representation of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Figure 2:
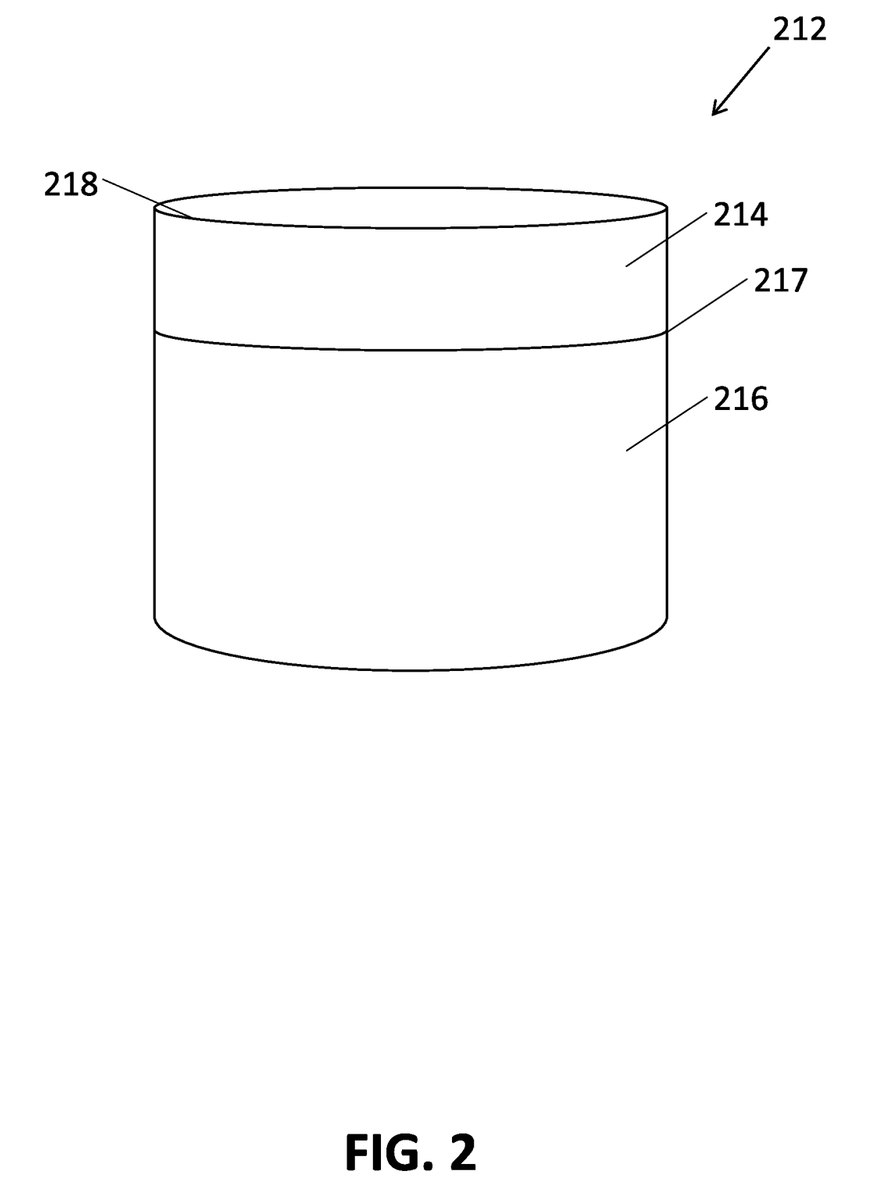
FIG. 2 is a representation of a PCD element, according to at least one embodiment of the present disclosure.

FIG. 2 is a representation of a PCD element 212, according to at least one embodiment of the present disclosure. The PCD element 212 may include an PCD layer 214. The layer 214 may be formed by high-pressure high-temperature (HPHT) sintering of diamond grains in the presence of a catalyst or binder material, such as cobalt or nickel. To form the layer 214, diamond powder may be mixed with the binder powder, and the mixture subjected to high pressure and temperature, which may be as high as 55-60 kbar and 1400° C. However, one having skill in the art will understand that these pressures and temperatures are exemplary, and other pressures and temperatures may be used in an HPHT process. The binder material may catalyze diamond-to-diamond bonding. While the above description of the layer 214 has been described with reference to the forming of a PCD layer 214, it should be understood that other layers 214 may be formed, including polycrystalline boron nitride (PCBN).

In some embodiments, PCD element 212 may include a substrate 216. The layer 214 may be bonded to the substrate during HPHT sintering. In some embodiments, the substrate may include a powder including the catalyst for diamond sintering. During the HPHT process, the catalyst from the substrate may infiltrate the diamond grains in the layer 214, which may help to sinter the diamond grains in the layer 214. In some embodiments, the substrate may be formed of substrate materials, including carbides, nitrides, carbonitrides, ceramics, metallic materials, cermet materials, and combinations thereof. The layer 214 is attached to the substrate 216 at an interface 217. The interface 217 may be the surface between the layer 214 and the substrate 216. In some embodiments, the interface 217 may be planar (e.g., flat). In some embodiments, the interface 217 may include one or more surface features. For example, the interface may be irregular, including one or more surface features including bumps or protrusions. The surface features may help to mechanically interlock the layer 214 and the substrate.

In some embodiments, the PCD element 212 may be configured to be attached to a bit (e.g., bit 110 of FIG. 1). During operation, a cutting edge 218 of the layer 214 may engage and erode the formation. In some embodiments, the layer 214 may be formed from PCD. In some embodiments, the layer 214 is thermally stable PCD.

Figure 3:
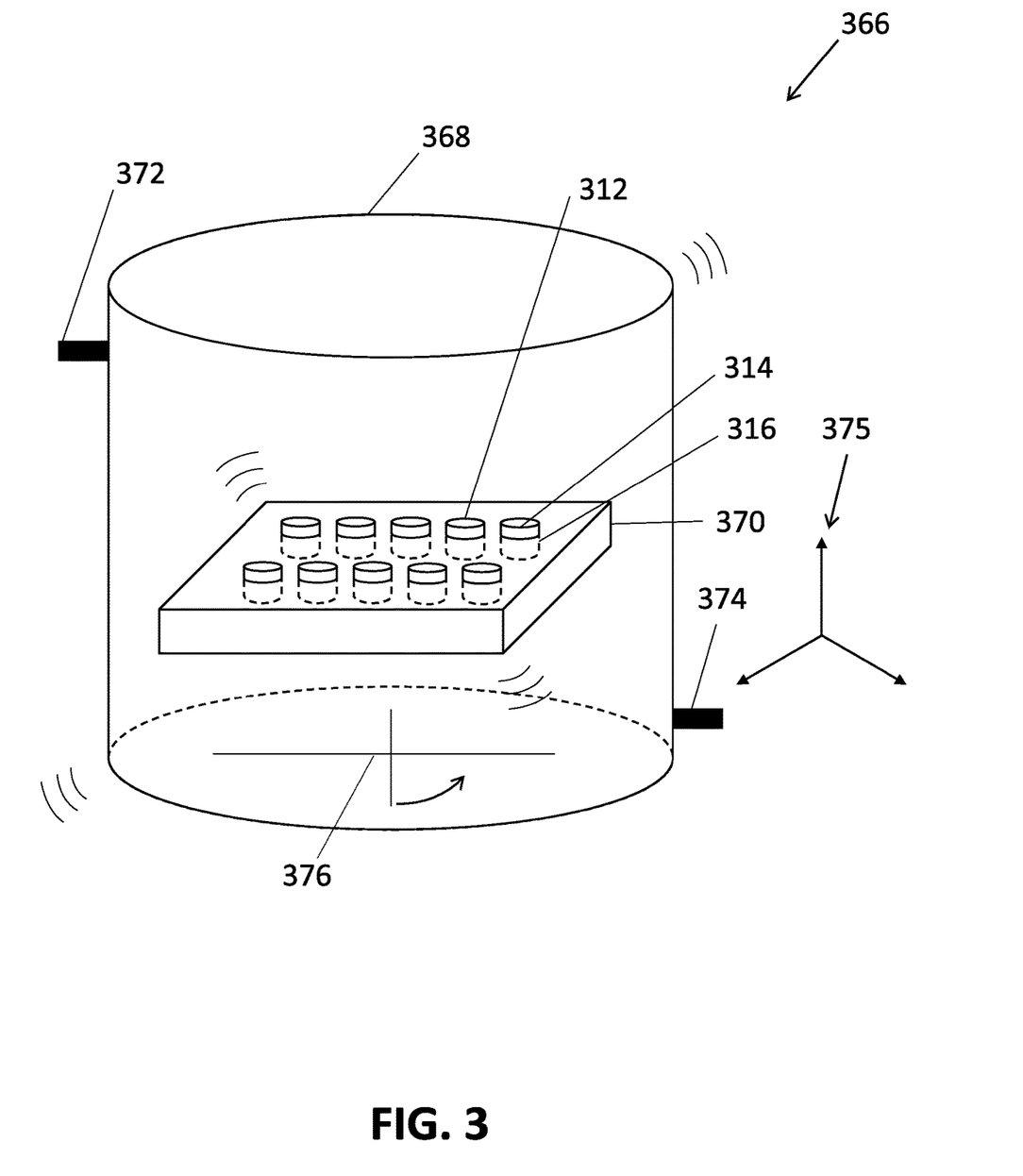
FIG. 3 is a representation of a PCD processing system, according to at least one embodiment of the present disclosure.

FIG. 3 is a representation of a PCD processing system 366, according to at least one embodiment of the present disclosure. The PCD processing system 366 includes a processing vessel 368. A processing tray 370 includes a plurality of PCD elements 312. The processing tray 370 may be placed inside an interior of the processing vessel 368. Processing fluid (such as leachants, rinsing agents, and so forth) may enter the processing vessel 368 through a fluid inlet 372. The processing fluid may exit the processing vessel 368 through a fluid outlet 374. In some embodiments, the fluid inlet 372 and the fluid outlet 374 may include a nozzle. The nozzle at the fluid inlet 372 may control the flow of processing fluid into the processing vessel 368 and the nozzle at the fluid outlet 374 may control the flow of processing fluid out of the processing vessel.

A plurality of PCD elements 312 may be inserted into the processing tray 370. In this manner, many PCD elements may be processed at once. In some embodiments, each PCD element in the processing tray 370 may be processed in the same way (e.g., using the same processing parameters). Thus, by placing multiple PCD elements 312 on the processing tray 370 and processing each PCD element 312 with the same processing parameters in the processing vessel 368, the processed PCD elements 312 may be uniform, or show less variability than conventional processes.

In some embodiments, the PCD layer 314 of the PCD elements may be exposed above an upper surface of the processing tray 370. The substrate 316 may be located inside a recess in the processing tray 370. The substrate 316 may be protected from the processing fluid inside the processing vessel. This may help to prevent any leachants or other caustic processing fluids from damaging the substrate 316 and/or leaching material from the substrate.

In some embodiments, the PCD elements 312 may be moved relative to the processing fluid. For example, the processing vessel 368 may be moved along one or more of the coordinate axes 375. In some embodiments, the processing vessel 368 may be agitated, such as by a shaker or vibrator. In some examples, the processing tray 370 may be rotated, translated, or otherwise moved along one or more of the coordinate axes 375 within the interior of the processing vessel 368. In some embodiments, the processing tray 370 may be agitated, such as by a shaker or vibrator. In some embodiments, both the processing vessel 368 and the processing tray 370 may be moved along any of the coordinate axes 375 and/or agitated to move the PCD elements 312 relative to the processing fluid.

In some embodiments, the processing fluid inside the processing vessel 368 may be agitated. For example, a stirrer 376 inside the processing vessel 368 may stir the processing fluid. In some embodiments, the stirrer 376 may be controlled by a motor. In some embodiments the stirrer 376 may be a magnetic stirrer, controlled by a rotating magnet outside of the processing vessel 368. In some embodiments, any combination of movement of the processing vessel 368, the processing tray 370, and the stirrer 376 may move the PCD elements 312 relative to the processing fluid and/or the processing fluid relative to the PCD elements 312, along any of the coordinate axes 375.

As discussed below, the temperature of the PCD elements and/or the fluid inside the processing vessel may be controlled to adjust the leaching characteristics of the PCD element. In some embodiments, heating elements may be incorporated within the processing vessel 368. In some embodiments, external sources (e.g., heating elements, heat exchangers) near or coupled to the processing vessel 368 may be controlled to adjust the temperature of the PCD element and/or the fluid. In some embodiments.

Figure 41:
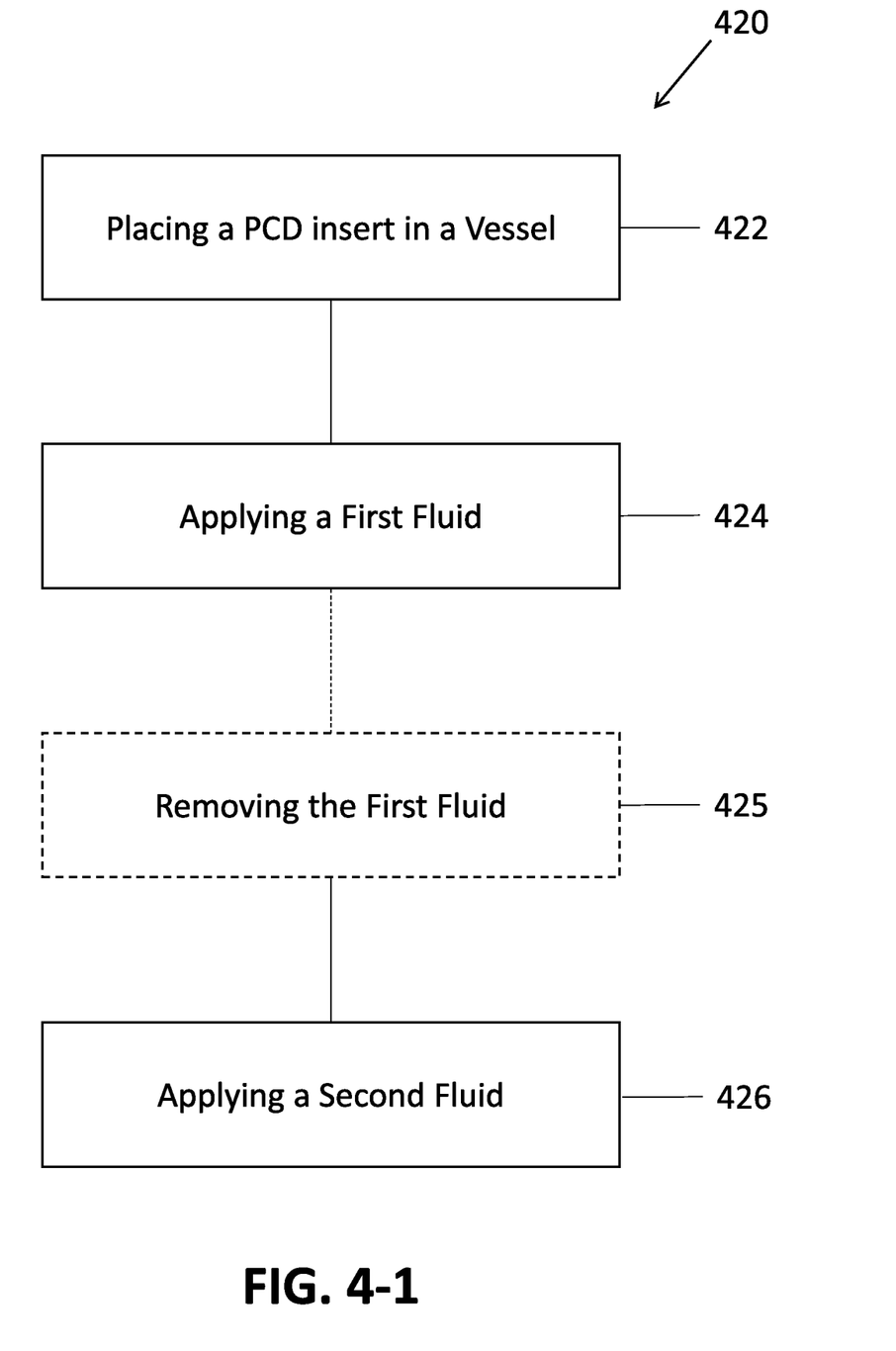

FIG. 4-1 is a representation of a method 420 for processing a PCD element. In some embodiments, the method 420 includes placing the PCD element in a vessel at 422. The vessel may include any vessel. For example, the vessel may include a fully enclosed vessel, a partially closed vessel, an open vessel, or any other vessel. In some embodiments, the PCD element may be placed in the vessel using an automated process. For example, the PCD element may be placed in the vessel using a robotic arm, a conveyor belt, a chute, a gravity feed, or other automated process. In some embodiments, a single PCD element may be placed in the vessel. In some embodiments, a plurality of PCD elements may be placed in the vessel simultaneously.

In some embodiments, a first fluid may be applied to the PCD element in the vessel at 424. In some embodiments, the first fluid may be applied after the PCD element is placed in the vessel. In some embodiments, applying the first fluid may include immersing the PCD element in the first fluid. In some embodiments, the first fluid may be applied for a first period of time. In other words, the PCD element may be immersed in the first fluid for the first period of time. For example, the PCD element may be partially or fully submerged (e.g., all exposed surfaces of the PCD element may be covered by the first fluid) while immersed in the first fluid. In some embodiments, the first fluid may be any fluid. For example, the first fluid may be a preparation fluid, such as a fluid used to wash and/or pre-treat the PCD element. In some embodiments, residual chemicals from the HPHT process may remain on the PCD insert that may inhibit leaching. The first fluid may be used to clean and/or chemically remove these (and other) chemicals from the PCD insert prior to leaching.

In some embodiments, the first fluid may be a leachant. The first leachant may at least partially dissolve, or begin to dissolve, the binder between crystals in the PCD element. In some embodiments, the first leachant may be applied to the PCD element while the insert is inside the vessel. In other words, the first leachant may be applied to the PCD element without moving the PCD element from the vessel. In some embodiments the first fluid may include any fluid, including leachants, rinsing agents, salts, washing solutions, basic solutions, other solutions, and combinations thereof.

In some embodiments, a second fluid may be applied to the PCD element in the vessel at 426. In some embodiments, applying the second fluid may include immersing the PCD element in the second fluid. In some embodiments, the second fluid may include any fluid, including leachants, rinsing agents, salts, washing solutions, basic solutions, other solutions, and combinations thereof. In some embodiments, the second fluid may be used to rinse the PCD element, such as rinsing of the first fluid, a leachant, or other residual chemicals from a prior processing step.

In some embodiments, the second fluid may be a leachant, and the PCD element may be partially or fully immersed in the second fluid. In some embodiments, the second fluid may at least partially dissolve, or begin to dissolve, the binder between crystals in the PCD layer.

In some embodiments, the first fluid may be applied to the PCD element while the insert is inside the vessel. In other words, the first fluid may be applied to the PCD element without moving the PCD element from the vessel. In some embodiments, the first fluid may optionally be removed from the vessel before the second fluid is inserted into the vessel at 425. In other words, the vessel may be drained of the first fluid before being filled with the second fluid. In some embodiments, the second fluid may be added to the vessel and mixed with a quantity of the first fluid in the vessel. For example, the second fluid may include a catalyst to cause or to increase the leaching reaction of the first fluid with the binder in the PCD layer. The mixture of the first fluid and the second fluid may at least partially dissolve the binder between crystals in the PCD layer.

In some embodiments, the first fluid may be different from the second fluid. In some embodiments, the first fluid may be the same as the second fluid. For example, after the first fluid dissolves a portion of the binder, the first fluid may have a reduced leaching capacity (e.g., the pH of the fluid may change, the solubility of the binder in the first fluid may be reached). Thus, the first fluid may be removed (e.g., drained from the vessel), and the second fluid, or a second round of the same leachant chemical used in the first fluid, may be applied to the PCD element. In some embodiments, a continuous flow of a fluid may flow through the vessel and across the PCD element. In some embodiments, more than two fluids may be applied to the PCD element simultaneously. For example, any number of fluids may be applied to the PCD element, including 1, 2, 3, 4, 5, 6, 7, 8, 9, 10, or more fluids may be applied to the PCD element. In some embodiments, more than two leachants may be applied to the PCD layer sequentially. For example, a first leachant may be applied to the PCD layer, the first leachant may be removed from the vessel, a rinsing agent may be applied to the PCD layer, then a second leachant or a mixture of leachants may be applied to the PCD layer.

In some embodiments, the first and/or the second fluids (collectively fluids) may be applied using an automated process. For example, the vessel may include an inlet and an outlet. The inlet may be controlled by an inlet nozzle and the outlet may be controlled by an outlet nozzle. After the PCD element has been placed in the vessel, a valve in the inlet and/or the outlet nozzle may open and direct the fluids into and out of the vessel through the inlet and the outlet. In some embodiments, the fluids may be placed in and removed from the vessel without handling by a user or a technician. In other words, the automated process to apply the fluids may fill and/or drain the vessel without the technician being exposed to the fluids, and without the need for the technician to be clothed in extensive personal protective equipment (e.g., a hazmat suit). In some embodiments, the inlet and the outlet may be different elements of the vessel. In some embodiments, the inlet and the outlet may be the same element of the vessel.

In some embodiments, the vessel may be filled and/or drained with the fluids without the technician being exposed to the fluids. For example, the nozzle may be directly connected to the inlet, and the vessel may be enclosed and sealed such that the PCD elements and the fluid may not be visible or accessible by the technician. In at least one embodiment, automatically applying the fluids to the PCD element may improve the health and safety of the technicians, improve processing throughput, enable the elimination or reduction in capacity of ventilation equipment, reduce processing delays, and combinations thereof.

Figure 42:
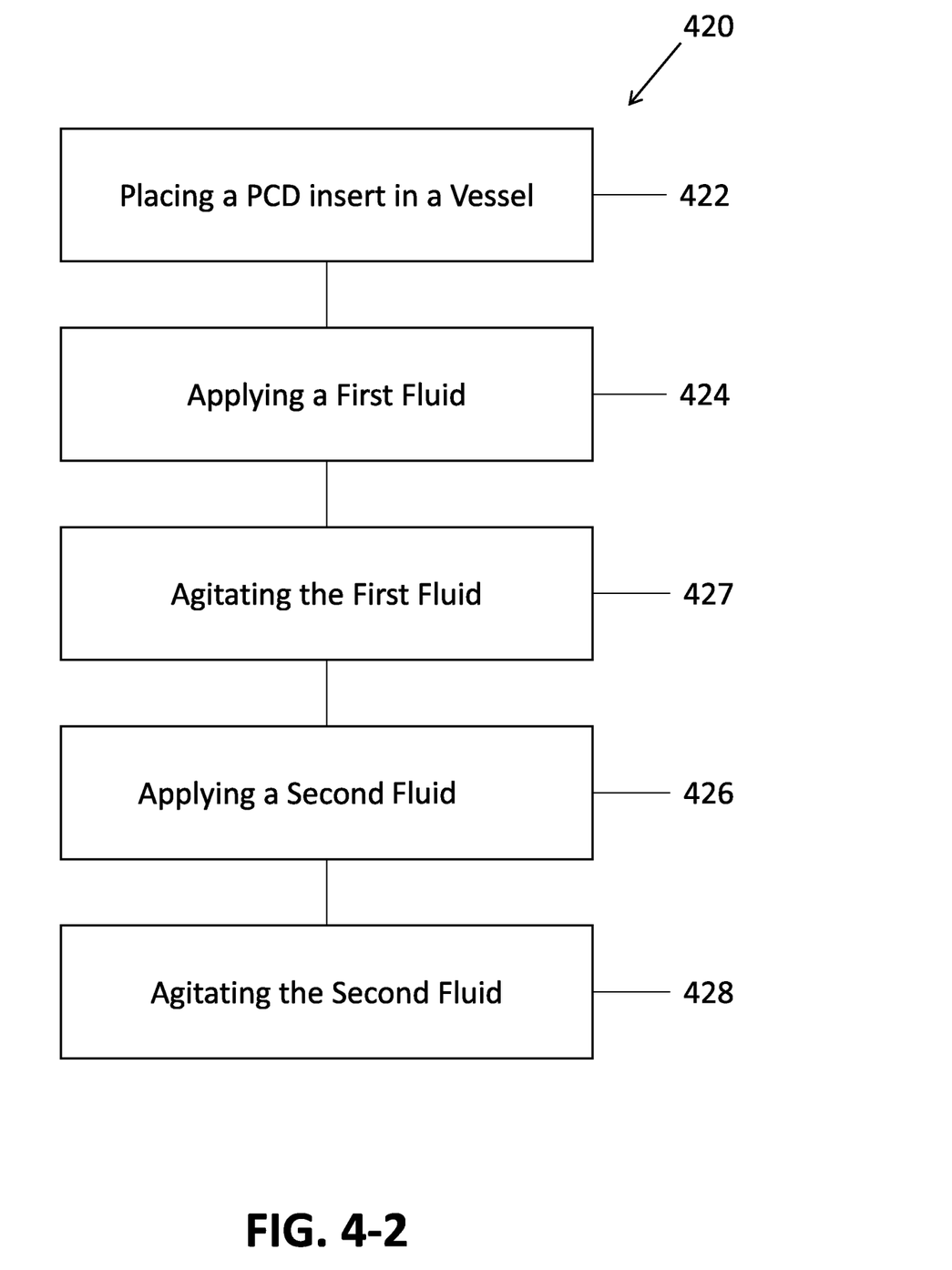

FIG. 4-2 is another representation of the method 420 of FIG. 4-1. In the embodiment shown, the method 420 includes causing relative movement between the fluid and the PCD element (e.g., agitating) the first fluid at 427 and/or the second fluid at 428. In some embodiments, agitating the fluids may increase the rate of leaching and/or processing of the PCD element. In some embodiments, the fluids may be agitated using a stirrer inside the vessel. In some embodiments, the stirrer may be moved using a changing magnetic field. For example, the stirrer may be fabricated from a magnetic material, and an alternating magnetic field may cause the stirrer to rotate, which may agitate the fluids. In some embodiments, the stirrer may be moved by a motor. In some embodiments, the entire vessel may be agitated. For example, the entire vessel may be shaken, rotated, turned over, or otherwise moved to agitate the fluids inside the vessel. In some embodiments, the PCD element (or elements) within the vessel may be agitated. For example, the PCD element may be rotated, raised, lowered, or otherwise moved within the vessel. In some embodiments, any combination of fluids, PCD element, and the vessel may be agitated during processing of the PCD element.

Figure 5:
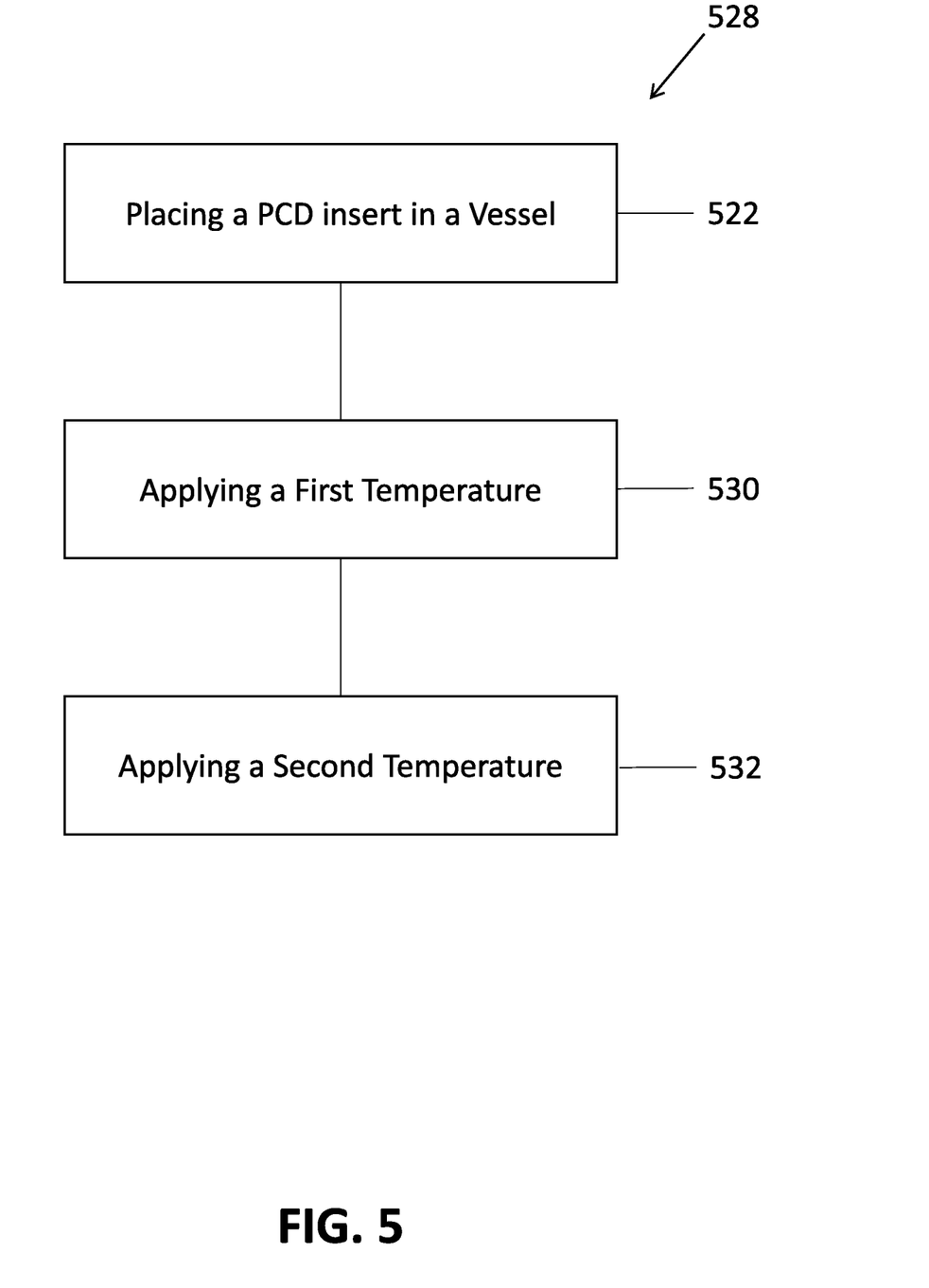
FIG. 5 is a representation of another method for processing polycrystalline diamond, according to at least one embodiment of the present disclosure.

FIG. 5 is a representation of a method 528 for processing a PCD element. The method 528 includes placing the PCD element in a vessel at 522. The method 528 may further include applying a first temperature to the PCD element in the vessel at 530. For example, the PCD element may be placed in a fluid (or such as a leachant as described above), and the temperature of the fluid, the vessel, and/or the PCD element may have a first temperature. In some embodiments, a second temperature may be applied to the PCD element at 532. In some embodiments, the fluid, the vessel, and/or the PCD element may be heated up. For example, the fluid, the vessel, and/or the PCD element may be heated using a radiative heat element, a resistive heat element, and inductive heat element, or other heat element. In some embodiments, the fluid may be heated without boiling and changing the phase of the fluid. In some embodiments, the fluid, the vessel, and/or the PCD element may be cooled down. For example, refrigerant coils may cool down the vessel, the PCD element, and/or the insert. In some embodiments, more than two temperatures may be applied to the fluids or PCD elements. For example, a temperature program having any number of temperatures may be applied to the fluids or PCD elements, including 1, 2, 3, 4, 5, 6, 7, 8, 9, 10, or more temperatures. The temperature program for the one or more fluids may include intervals with positive temperature gradients, isothermal intervals, intervals with negative temperature gradients, or any combination thereof.

Changing the temperature of the system may change the leaching characteristics of the PCD element. For example, increasing the temperature of the system may increase the leaching speed. In some examples, decreasing the temperature of the system may slow down or stop the leaching speed. This may allow the technician to leach a precise amount of binder from the PCD element or to achieve a desired leach depth, which may improve the quality and/or consistency of the leached PCD element.

Figure 6:
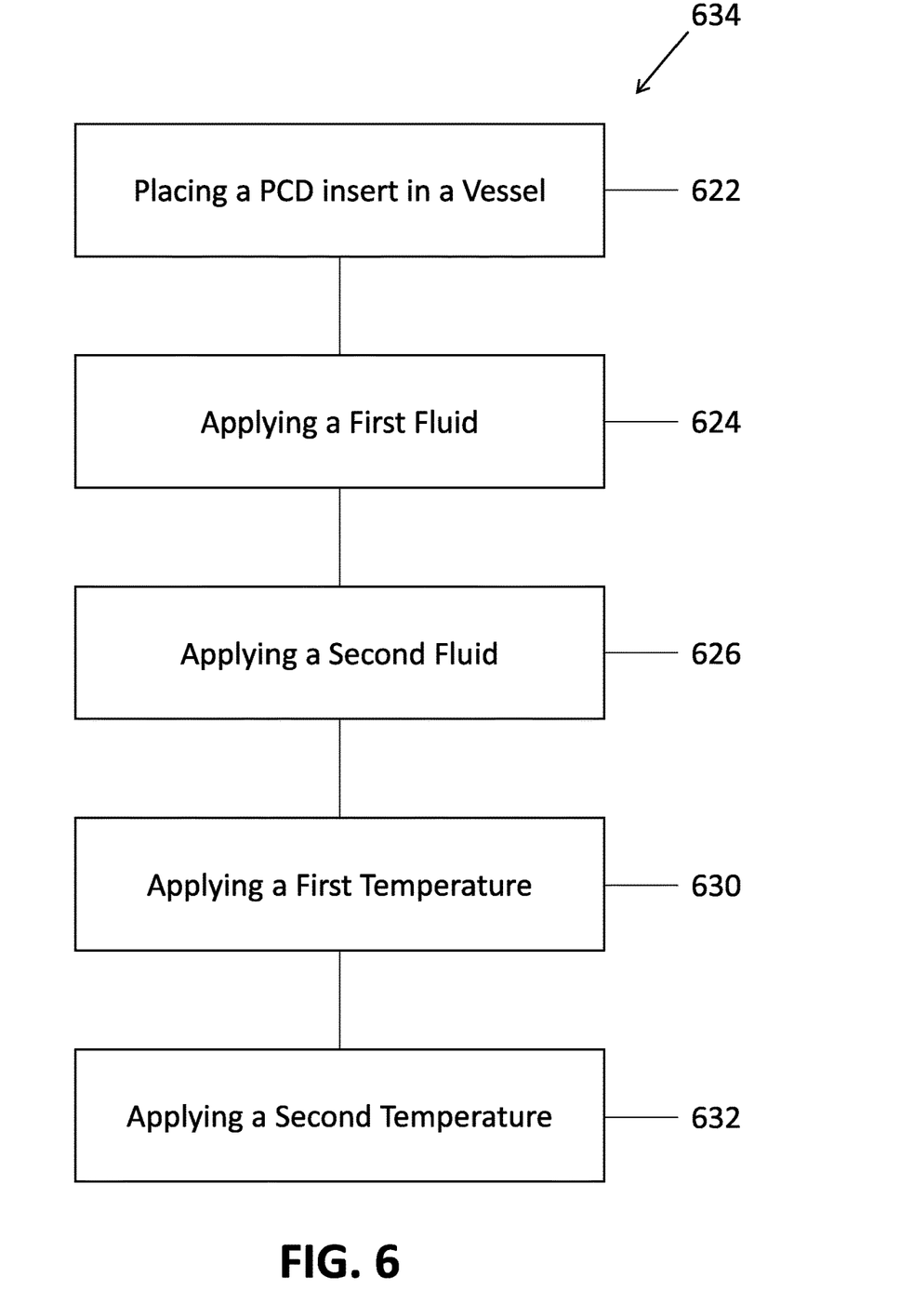
FIG. 6 is a representation of yet another method for processing polycrystalline diamond, according to at least one embodiment of the present disclosure.

FIG. 6 is a representation of a method 634 of processing a PCD element, according to at least one embodiment of the present disclosure. The method 634 may include placing a PCD element in a vessel at 622. In some embodiments, a first fluid may be applied to the PCD element at 626 and a second fluid may be applied to the PCD element at 628. In some embodiments, a first temperature may be applied to the PCD element at 630 and a second temperature may be applied to the PCD element at 632. In some embodiments, the first temperature may be applied while applying the first fluid and the second temperature may be applied while applying the second fluid. In some embodiments, the first and second temperature may be applied while applying the first fluid. In some embodiments, the first temperature may be applied to the PCD element while exposed to the first fluid and be maintained until the second fluid is applied, and the second temperature may be applied to the PCD element while exposed to the second fluid. In some embodiments, both the first and the second temperatures may be applied to the PCD element while disposed in both the first and second fluid. In some embodiments, the fluids or PCD elements may be agitated at any time, as discussed above with FIG. 5. For example, the fluids may be agitated while changing from the first to the second temperature, to help evenly distribute the temperature throughout the fluid.

In some embodiments, the PCD element may be processed with any combination of fluids, temperatures, soaking durations, and so forth. For example, the PCD element may be washed with a first fluid. The first fluid may be drained, and the PCD element may be soaked with a second fluid (e.g., a leachant) for a duration. The PCD element and/or the second fluid may be heated to a first temperature, soaked for a duration, and heated to a second temperature, agitated, and soaked for a duration. The second fluid may be drained, and a third fluid (such as a rinse) added, and the third fluid agitated. This process may be repeated with many different fluids, leachants, temperatures, and agitation programs until a desired level of processing of the PCD element is reached. During each individual step in the process, the PCD element may be soaked (e.g., left in the fluid) or rinsed (e.g., had a continuous flow of fluid flowing across) for any duration of time. Individual durations of time (e.g., for soaking, rinsing, agitating, and so forth) may include 1 s, 30 s, 1 min, 5 min, 10 min, 20 min, 30 min 45 min, 1 hour, 1.5 hours, 2 hours, 3 hours, 5 hours, 10 hours, 15 hours, 20 hours, 1 day, 1.5 days, 2 days, or any duration in between. Total processing duration may take as long as 30 days, and involve many different fluids, soaking durations, temperatures, agitation programs, and so forth. When processing of the PCD element is complete, the PCD element may be removed from the vessel and be ready for use.

Figure 7:
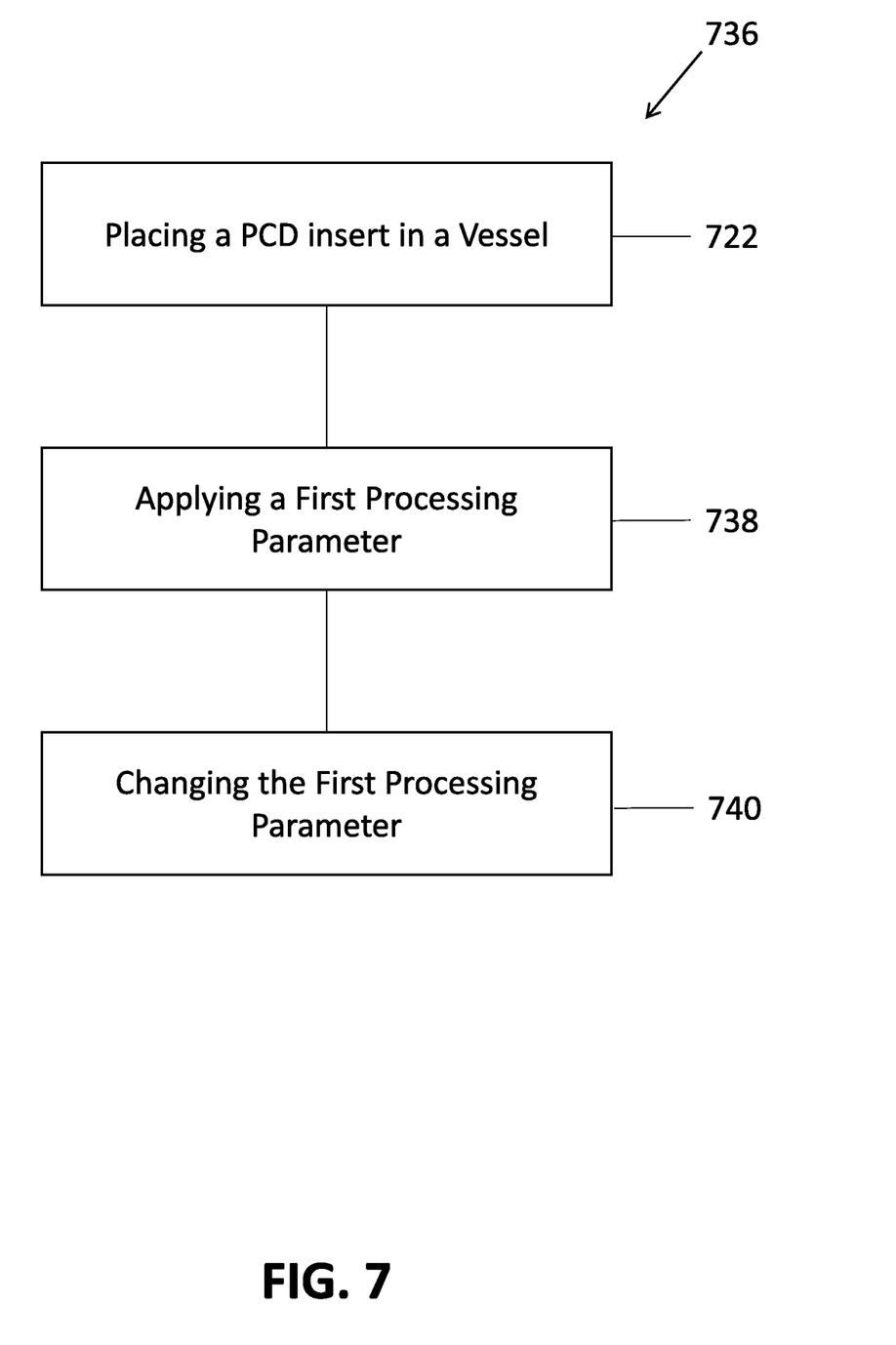
FIG. 7 is a representation of still another method for processing polycrystalline diamond, according to at least one embodiment of the present disclosure.

FIG. 7 is a representation of a method 736 for processing a PCD element, according to at least one embodiment of the present disclosure. In some embodiments, the method 736 may include placing a PCD element in a vessel at 722. A first processing parameter may be applied to the PCD element at 738. For example, a fluid may be applied, a temperature may be applied, or movement between the fluid and the PCD element may be caused within the vessel. In some embodiments, the first leaching parameter may be changed at 740. For example, a first fluid may be replaced with a second fluid. In some examples, a rinsing fluid may be replaced with a leachant, or a leachant may be rinsed with a rinsing fluid. In some examples, a first temperature may be changed to a second temperature. In some examples, no agitation may be replaced with agitation, or a first agitation rate may be changed to a second agitation rate. Changing the processing parameter may change the leaching rate and/or the extent of the amount of binder leached. Changing processing parameters may allow a technician to customize and optimize the final leached PCD element to a given specification.

Figure 8:
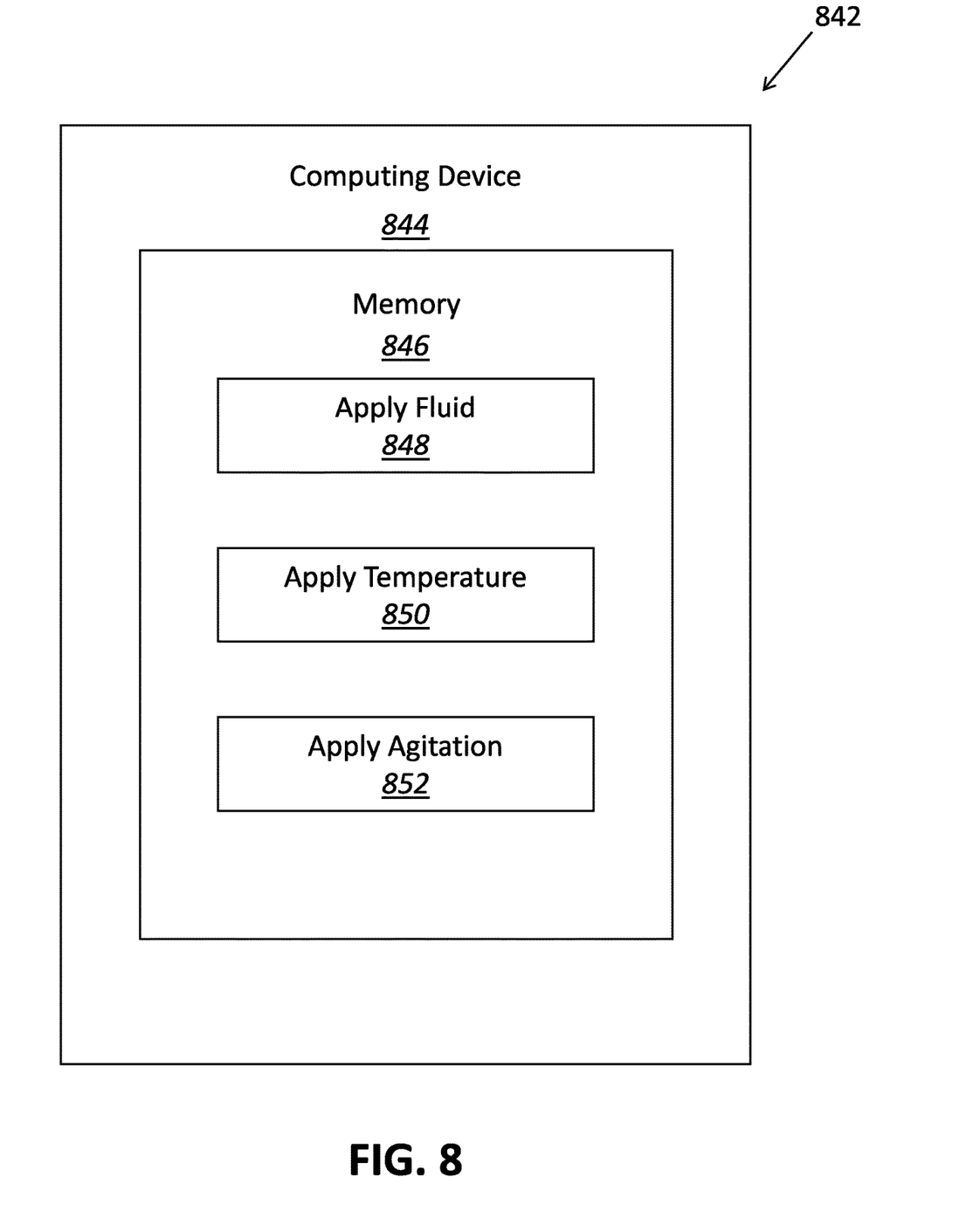
FIG. 8 is a representation of a system for processing polycrystalline diamond, according to at least one embodiment of the present disclosure.

FIG. 8 is a representation of an automation system 842, according to at least one embodiment of the present disclosure. The automation system 842 may include a computing device 844, such as a processor. The computing device 844 may include a memory 846. The memory 846 may include instructions which, when accessed by the processor, cause the processor to perform functions or tasks. In some embodiments, the memory 846 may include instructions for the processor to apply fluids 848. In some embodiments, the memory 846 may include instructions for the processor to apply a temperature 850. In some embodiments, the memory 846 may include instructions for the processor to apply agitation 852. In this manner, the computing device 844 may include all the instructions necessary to operate the automation system 842. In some embodiments, the automation system 842 may include operator overrides. For example, a technician may be able to override the instructions to apply chemicals 848, to apply the temperature 850, and/or to apply agitation 852.

In some embodiments, the memory 846 may include instructions for any task, operation, or processing parameter, including those acts discussed in reference to FIG. 4-1 through FIG. 7. For example, the memory may include instructions to apply a third and a fourth temperature while applying the first fluid or the second fluid. In some examples, the memory may include instructions to test the PCD element, such as using x-ray imaging. In some examples, the memory may include instructions to insert the PCD element before applying the first fluid and to remove the PCD element after applying the second fluid.

Figure 9:
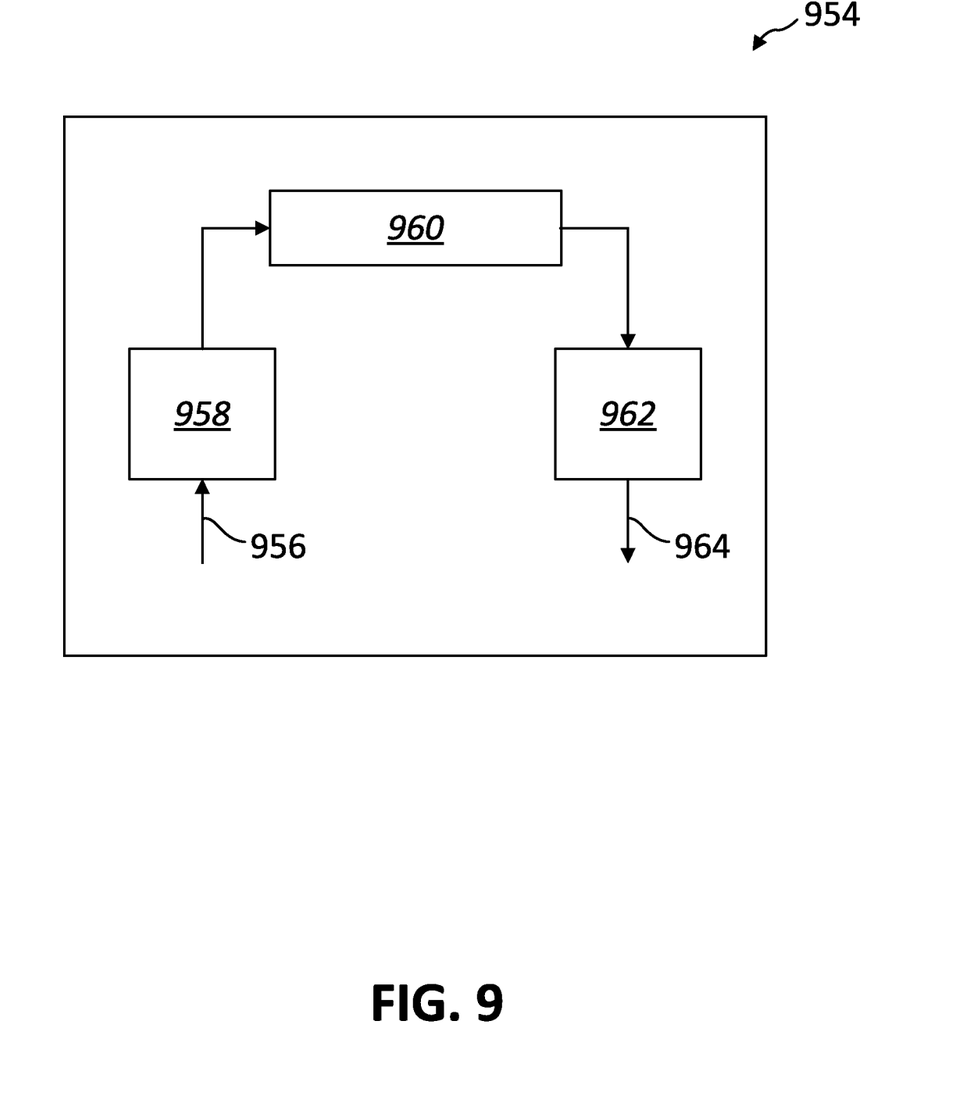
FIG. 9 is a representation of another system for processing polycrystalline diamond, according to at least one embodiment of the present disclosure.

FIG. 9 is a representation of a PCD processing system 954, according to at least one embodiment of the present disclosure. The PCD processing system 954 may include many automated systems, such as robotic PCD element handlers, conveyor belts, fluid lines, and other automated systems. This may reduce user handling of the PCD elements. This, in turn, may allow the PCD processing system 954 to have a reduced footprint, and operate with a reduced square footage. For example, a closed loop system that reduces or eliminates user exposure to fluids and byproducts of the leaching process may enable the reduction in size or elimination of system components, such as scrubbers or ventilation hoods. This may allow the PCD processing system 954 to utilize a smaller portion of a manufacturing plant, allowing the freed area to be used for other processes, thereby saving costs. In some embodiments, the PCD processing system may have an area that is less than 400 square feet (37.2 square meters), 450 square feet (41.8 square meters), 500 square feet (46.5 square meters), 600 square feet (55.7 square meters), 700 square feet (65.0 square meters), 800 square feet (74.3 square meters), 900 square feet (83.6 square meters), 1,000 square feet (92.9 square meters), or any value therebetween. In some embodiments, the area may be less than 400 square feet or more than 1,000 square feet.

In some embodiments, the PCD processing system 954 may include a PCD input 956. The PCD input 956 may direct PCD elements to a PCD element preparation system 958. The PCD element preparation system 958 may prepare the PCD elements for processing, which may include identifying individual PCD elements, washing, placement in the vessel, other preparation activities, and combinations thereof.

After preparation, the PCD elements may then be transferred to a processing line 960. The processing line 960 may include any type of PCD processing. For example, the processing line 960 may include means for applying fluids (e.g., leachants, neutralization fluids, rinsing agents, catalysts), means for changing temperature of the PCD element, fluid, or vessel, means for agitating the fluid or the PCD element, and other processing means. For example, the processing line 960 may include piping, valves, and nozzles to direct fluid into and out of the vessel. In some examples, the processing line 960 may include storage tanks for unused and used fluid. Unused fluid may be directed into the vessel from an unused storage tank through one or more pipes, valves, and nozzles, and used fluid may be directed to a used storage tank through one or more pipes, valves, and nozzles. In some examples, the processing line 960 may include resistive heaters for the vessels, inductive heaters for the vessels, and/or heating chambers. In some examples, the processing line 960 may include one or more agitation stations, such as shakers, stirrers, and magnetic stirring plates, which may be configured to agitate the fluid in the vessel.

After the PCD element has been processed on the processing line 960, the PCD element may be tested at a testing station 962. In some embodiments, the testing station 962 may include any testing mechanism, such as x-ray imaging, visual inspection, chemical inspections, or any other testing mechanism. Any PCD element that does not pass the testing may be scrapped or reworked. In some embodiments, the testing station 962 may be automated. After the PCD elements have been tested, the leached PCD elements may exit the PCD processing system 954 through a PCD output 964.

The embodiments of the PCD processing system have been primarily described with reference to wellbore drilling operations; the PCD processing systems described herein may be used in applications other than the drilling of a wellbore. In other embodiments, PCD processing systems according to the present disclosure may be used outside a wellbore or other downhole environment used for the exploration or production of natural resources. For instance, PCD processing systems of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for processing polycrystalline diamond (PCD), comprising:
    placing the PCD in a vessel, wherein the vessel is an enclosed system, and wherein the PCD comprises a PCD layer and a substrate;
    applying a first fluid to the PCD in the vessel, wherein applying the first fluid comprises immersing the PCD in the first fluid such that all exposed surfaces of the PCD layer are covered by the first fluid; and
    applying a second fluid to the PCD in the vessel, without moving the PCD from the vessel, wherein applying the second fluid comprises immersing the PCD in the second fluid such that the PCD layer is exposed to the second fluid; and
    agitating the first fluid or the second fluid by moving the PCD within the first fluid or the second fluid.

2. The method of claim 1, comprising removing at least a portion of the first fluid from the vessel before applying the second fluid to the PCD in the vessel.

3. The method of claim 2, comprising:
    controlling a temperature of the PCD to a first temperature while applying the second fluid to the PCD in the vessel;
    soaking the PCD with the second fluid for a duration; and
    controlling the temperature of the PCD to a second temperature while soaking the PCD with the second fluid.

4. The method of claim 1, wherein agitating the first fluid or the second fluid further comprises using a magnetic stirrer.

5. The method of claim 1, wherein placing the PCD in the vessel comprises placing a plurality of PCD elements in the vessel.

6. The method of claim 1, wherein applying the first fluid occurs for a first period of time and applying the second fluid occurs for a second period of time, the first period of time being different from the second period of time.

7. The method of claim 1, wherein one of the first fluid or the second fluid is a rinsing fluid that is added to the vessel, and the other of the first fluid or the second fluid is a leachant.

8. The method of claim 1, comprising:
    controlling a temperature of the PCD to a first temperature while applying the first fluid to the PCD, and
    controlling the temperature of the PCD to a second temperature while applying the first fluid to the PCD.

9. The method of claim 8, comprising:
    controlling the temperature of the PCD to a third temperature while applying the second fluid to the PCD; and
    controlling the temperature of the PCD to a fourth temperature while applying the second fluid to the PCD.

10. The method of claim 1, comprising:
    controlling a temperature of the PCD to a first temperature while applying the first fluid to the PCD; and
    controlling the temperature of the PCD to a second temperature while applying the second fluid to the PCD.

11. The method of claim 10, comprising agitating the first fluid or the second fluid in the vessel.

12. The method of claim 1, comprising adjusting a rate of agitation of the first fluid or the second fluid in the vessel.

13. The method of claim 1, comprising testing the PCD using x-ray imaging.

14. The method of claim 1, comprising:
applying a third fluid to the PCD in the vessel after applying the second fluid to the PCD in the vessel,
wherein applying the second fluid to the PCD in the vessel occurs after applying the first fluid to the PCD in the vessel,
wherein first fluid comprises a first rinsing fluid, the second fluid comprises a leachant, and the third fluid comprises a second rinsing fluid.

15. A method for processing polycrystalline diamond (PCD), comprising:
placing the PCD in a vessel, wherein the vessel is an enclosed system, and wherein the PCD comprises a PCD layer and a substrate;
applying a first fluid to the PCD in the vessel, wherein applying the first fluid comprises immersing the PCD in the first fluid such that all exposed surfaces of the PCD layer are covered by the first fluid;
removing a portion of the first fluid from the vessel;
applying a second fluid to the PCD vessel after removing a portion of the first fluid from the vessel, wherein applying the second fluid comprises immersing the PCD in the second fluid such that the PCD layer is exposed to the second fluid;
controlling a temperature of the PCD to a first temperature; and
controlling the temperature of the PCD from the first temperature to a second temperature that is greater than the first temperature; and
agitating the first fluid or the second fluid by moving the PCD within the first fluid or the second fluid.

16. The method of claim 15, wherein controlling the second temperature to the PCD occurs without moving the PCD from the vessel.

17. The method of claim 15, wherein controlling the second temperature to the PCD occurs via induction heating.

18. The method of claim 15, comprising agitating the first fluid or the second fluid in the vessel using a magnetic stirrer, moving the PCD within the first fluid, moving the PCD within the second fluid, or any combination thereof.

* * * * *